US012644488B1

(12) United States Patent
Martins et al.

(10) Patent No.: US 12,644,488 B1
(45) Date of Patent: Jun. 2, 2026

(54) SLIDING CONTACT BEARING WITH LASH REDUCTION

(71) Applicant: KB Intellectual Property GmbH & Co. KG, Pullach (DE)

(72) Inventors: Carlos Henrique Ferrari Martins, Jundiaí (BR); Vinicius Cidade Silva, Jundiaí (BR); Rodrigo Araujo, Itu (BR)

(73) Assignee: KB Intellectual Property GmbH & Co. KG, Pullach (DE)

( * ) Notice: Subject to any disclaimer, the term of this patent is extended or adjusted under 35 U.S.C. 154(b) by 0 days.

(21) Appl. No.: 19/306,351

(22) Filed: Aug. 21, 2025

(51) Int. Cl.
　　*F16C 29/02*　　　(2006.01)
　　*B62D 1/187*　　　(2006.01)

(52) U.S. Cl.
　　CPC .............. *F16C 29/02* (2013.01); *B62D 1/187* (2013.01); *F16C 2326/01* (2013.01)

(58) Field of Classification Search
　　CPC ................................. F16C 29/02; B62D 1/187
　　See application file for complete search history.

(56) References Cited

U.S. PATENT DOCUMENTS

| | | | |
|---|---|---|---|
| 12,012,141 B2 | 6/2024 | Nagy | |
| 12,128,947 B1 | 10/2024 | Patki et al. | |
| 12,441,389 B1 * | 10/2025 | Pegley | F16C 17/02 |
| 12,525,777 B2 * | 1/2026 | Laflamme | H02G 3/22 |
| 2013/0322796 A1 | 12/2013 | Taylor | |
| 2016/0252133 A1 | 9/2016 | Caverly | |
| 2018/0208229 A1 * | 7/2018 | Kwon | B62D 1/187 |
| 2020/0255051 A1 * | 8/2020 | Noh | B62D 1/192 |

FOREIGN PATENT DOCUMENTS

| | | | | |
|---|---|---|---|---|
| EP | 3835173 A1 * | 6/2021 | | B62D 3/00 |

* cited by examiner

*Primary Examiner* — Nicole T Verley

(74) *Attorney, Agent, or Firm* — Reising Ethington P.C.

(57) ABSTRACT

A sliding contact bearing includes a body configured for insertion within, and movement along, a slot of a fixed structure. The body includes a bore disposed about an axis that receives a shaft and first and second flats on a radially outer surface that engage opposed surfaces formed in the slot. First, second, third and fourth legs project radially from the body, the first and second legs on opposite circumferential sides of the first flat and engaging the first surface formed in the slot and the third and fourth legs on opposite circumferential sides of the second flat and engaging the second surface formed in the slot. Insertion of the bearing into the slot causes movement of the first and second legs in a first direction and movement of the third and fourth legs in a second direction, opposite the first direction, from an unstressed position to a stressed position.

19 Claims, 11 Drawing Sheets

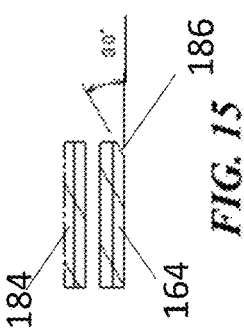
*FIG. 15*
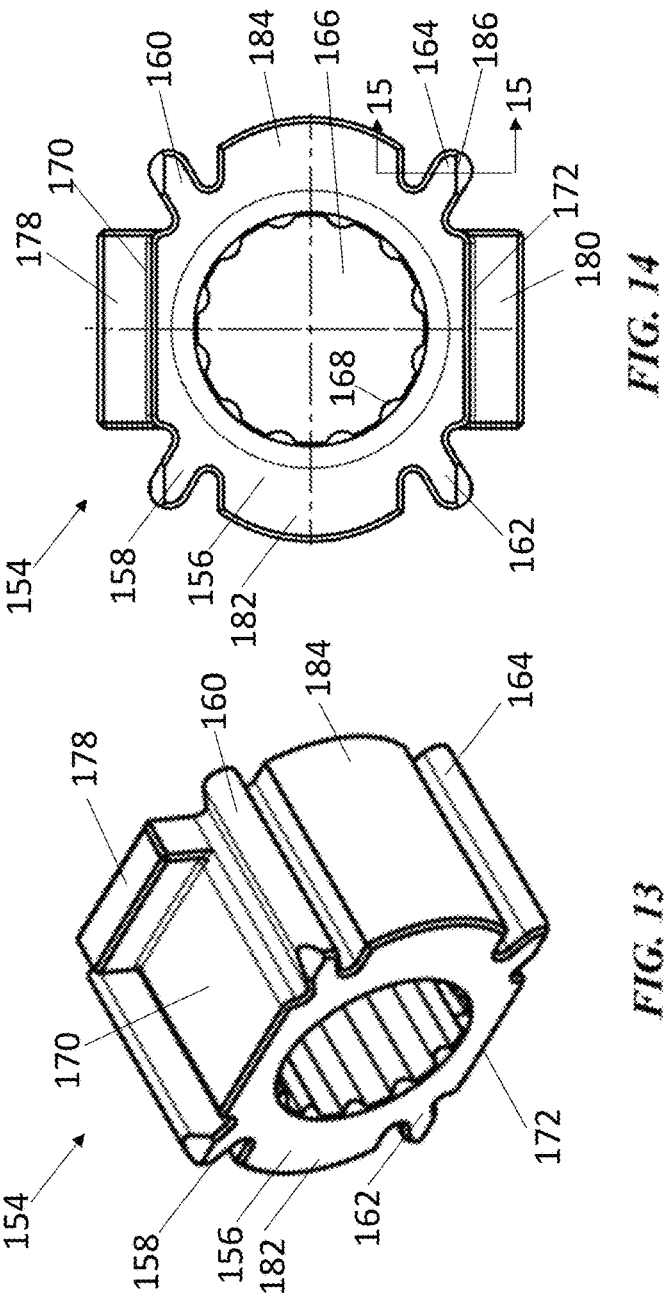
*FIG. 14*
*FIG. 13*

SLIDING CONTACT BEARING WITH LASH REDUCTION

BACKGROUND OF THE INVENTION a. Field of the Invention

This disclosure relates to a sliding contact bearing. In particular, this disclosure relates to a sliding contact bearing configured to reduce radial lash following movement of the bearing within an elongated slot in, for example, a steering assembly.

b. Background Art

A conventional vehicle steering system includes a steering assembly in which a steerable wheel is mounted on a steering shaft or column. The column is used to transfer steering commands input through the steering wheel by the vehicle operator/driver to a steering gear which in turn causes movement of a steering linkage used to turn vehicle wheels on each side of the vehicle. Conventional steering assemblies provide for adjustment of the position of the steering column to suit individual driver preferences including, for example, adjustment of the height of the steering wheel (and, therefore, the distance of the steering wheel from the driver) and adjustment of the tilt of the steering wheel (i.e., the angle of the steering wheel relative to the driver). The steering assembly typically includes a steering column body on which the steering column is supported and a pair of side brackets that are fixed to the vehicle body and that are also coupled to the steering column body in a manner permitting translational movement of the steering column body and steering column relative to the side brackets along one axis and rotational movement of the steering column body and steering column relative to the side brackets about another axis. The side brackets define elongate slots in which pivot pins extending from either side of the steering column body are received. Sliding contact bearings within the slots allow for movement of the pivot pins along the slots and rotation of the pivot pins thereby facilitating translational and rotational movement of the steering column body and steering column relative to the side brackets.

Movement of the sliding contact bearings within the slots of the side brackets during adjustment of steering column position by a vehicle operator produces some amount of radial lash between the bearings and slots due to tolerance build ups in the steering assembly components. As a result, if the vehicle operator subsequently applies certain forces to the steering wheel during operation of the vehicle, the operator may experience unintended movement of the steering wheel despite the steering wheel position being nominally locked into position following adjustment. This movement may create a distraction for the vehicle operator and is generally undesirable.

The inventors herein have recognized a need for a sliding contact bearing that will minimize and/or eliminate one or more of the above-identified deficiencies.

BRIEF SUMMARY OF THE INVENTION

This disclosure relates to a sliding contact bearing. In particular, this disclosure relates to a sliding contact bearing configured to reduce radial lash following movement of the bearing within an elongated slot in, for example, a steering assembly.

One embodiment of a sliding contact bearing includes a bearing body configured for insertion within, and movement along, a slot of a fixed structure. The bearing body defines a bore disposed about an axis and configured to receive a shaft. The bearing body further defines a first flat on a radially outer surface of the bearing body configured to engage a first surface formed in the slot and a second flat on the radially outer surface of the bearing body, diametrically opposite the first flat and configured to engage a second surface formed in the slot opposing the first surface. The sliding contact bearing further includes first and second legs projecting radially from the bearing body and disposed on opposite circumferential sides of the first flat. The first and second legs are configured for engagement with the first surface formed in the slot and insertion of the bearing body into the slot causes movement of each of the first and second legs in a first direction from an unstressed position to a stressed position. The sliding contact bearing further includes third and fourth legs projecting radially from the bearing body and disposed on opposite circumferential sides of the second flat. The third and fourth legs are configured for engagement with the second surface formed in the slot and insertion of the bearing body into the slot causes movement of each of the third and fourth legs in a second direction, opposite the first direction, from an unstressed position to a stressed position.

One embodiment of an apparatus for mounting a steering column in a vehicle includes a steering column body configured to couple a steering column mounting bracket in a fixed position relative to the steering column body, the steering column mounting bracket configured to support the steering column. The apparatus further includes a side bracket configured for coupling to a vehicle body mounting bracket and coupled to a first side of the steering column body in a manner permitting translational movement of the steering column body relative to the side bracket along a first axis and rotational movement of the steering column body relative to the side bracket about a second axis. The side bracket defines an elongate slot. The apparatus further includes a pivot pin extending from the first side of the steering column body. The apparatus further includes a sliding contact bearing disposed within the elongate slot of the side bracket. The sliding contact bearing includes a bearing body configured for insertion within, and movement along, the elongate slot. The bearing body defines a bore disposed about the second axis and configured to receive the pivot pin. The bearing body further defines a first flat on a radially outer surface of the bearing body configured to engage a first surface formed in the elongate slot and a second flat on the radially outer surface of the bearing body, diametrically opposite the first flat and configured to engage a second surface formed in the elongate slot opposing the first surface. The sliding contact bearing further includes first and second legs projecting radially from the bearing body and disposed on opposite circumferential sides of the first flat. The first and second legs are configured for engagement with the first surface formed in the elongate slot and insertion of the bearing body into the elongate slot causes movement of each of the first and second legs in a first direction from an unstressed position to a stressed position. The sliding contact bearing further includes third and fourth legs projecting radially from the bearing body and disposed on opposite circumferential sides of the second flat. The third and fourth legs are configured for engagement with the second surface formed in the elongate slot and insertion of the bearing body into the elongate slot causes movement of each of the third and fourth legs in a second direction, opposite the first direction, from an unstressed position to a stressed position.

A sliding contact bearing in accordance with the present teachings is advantageous relative to conventional bearings. The bearing takes up radial lash between the bearing and the slot in which the bearing is positioned during movement of the bearing within the slot. As a result, unexpected movement of the bearings and structures supported by the bearings following positional adjustments is reduced or eliminated. For example, in a steering assembly, once the position of the steering wheel has been adjusted by a vehicle operator and locked into the adjusted position, unintended movement of the steering wheel from forces applied to the steering wheel by the vehicle operator will be reduced or eliminated.

The foregoing and other aspects, features, details, utilities, and advantages of the present teachings will be apparent from reading the following description and claims, and from reviewing the accompanying drawings.

BRIEF DESCRIPTION OF THE DRAWINGS

FIG. 13 is a perspective of one embodiment of a sliding contact bearing that may be used in the apparatus of FIGS. 7-12.

FIG. 14 is a plan view of the sliding contact bearing of FIG. 13.

FIG. 15 is a cross-sectional view of the sliding contact bearing of FIGS. 13-14 taken alone line 15-15 in FIG. 14.

DETAILED DESCRIPTION OF THE INVENTION

Figure 1:
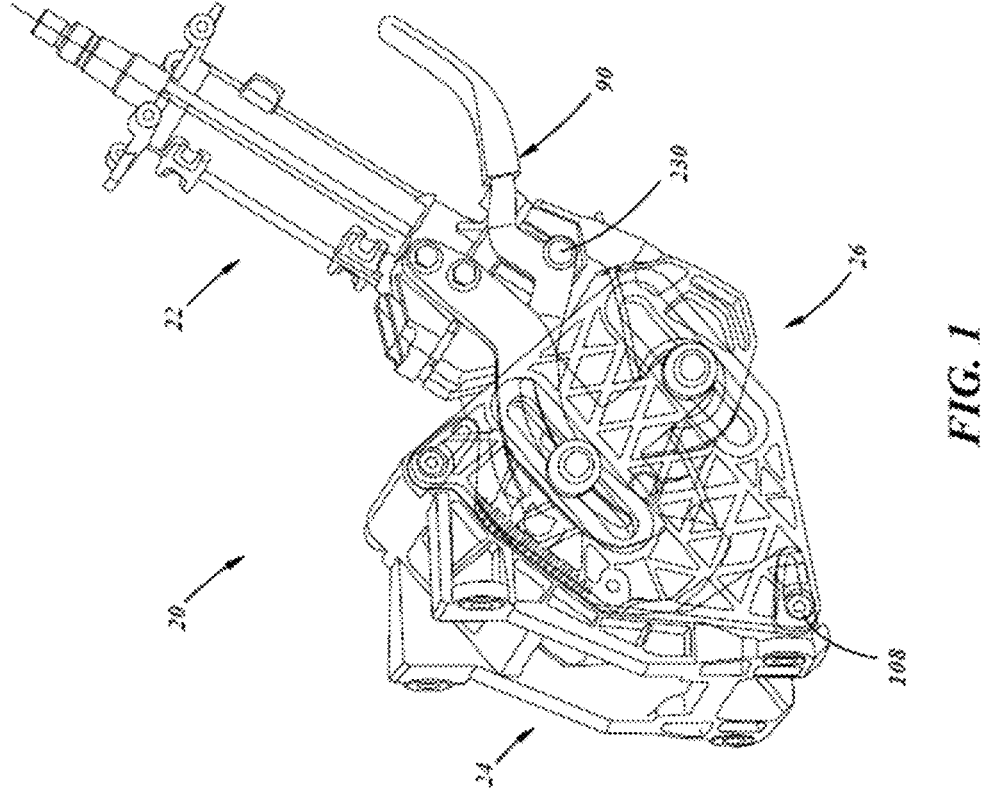
FIG. 1 is a perspective view of one embodiment of a steering assembly.
Figure 2:
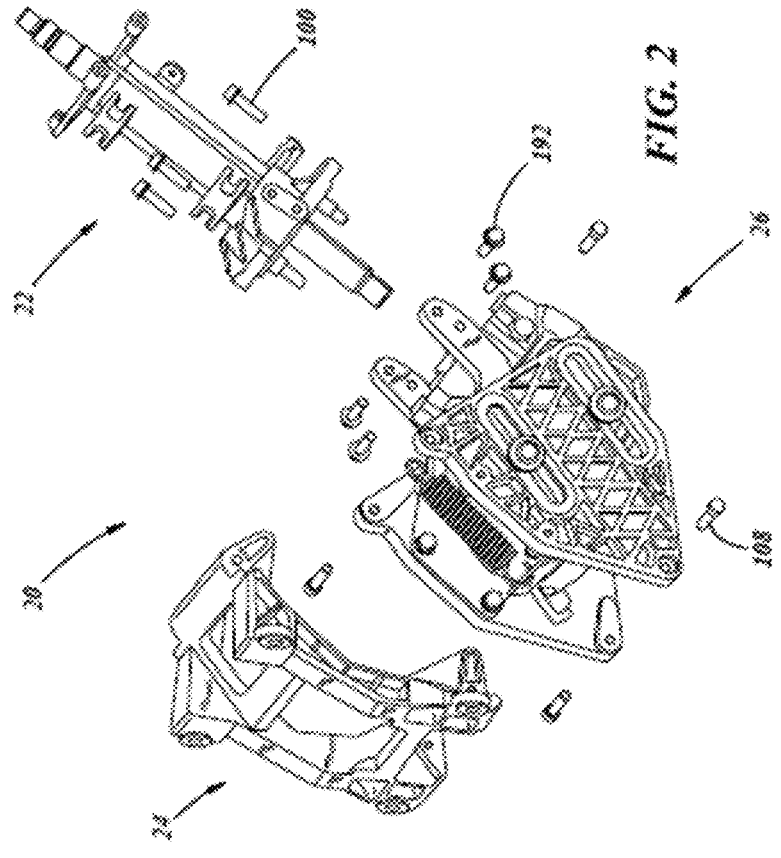
FIG. 2 is an exploded, perspective view of the steering assembly of FIG. 1.

Referring now to the drawings wherein like reference numerals are used to identify identical components in the various views, FIGS. 1-2 illustrate a steering assembly 20 for a vehicle including a sliding contact bearing in accordance with the present teachings. Assembly 20 provides a means for the driver to input steering forces to the vehicle to turn one or more steerable wheels on the vehicle. Assembly 20 transfers steering forces input by the driver to a steering gear which translates and augments those forces to move a steering linkage coupled to the steerable wheels. Assembly 20 may include a steering column 22, a vehicle body mounting bracket 24, and an apparatus 26 for mounting the steering column 22 in the vehicle.

Figure 4:
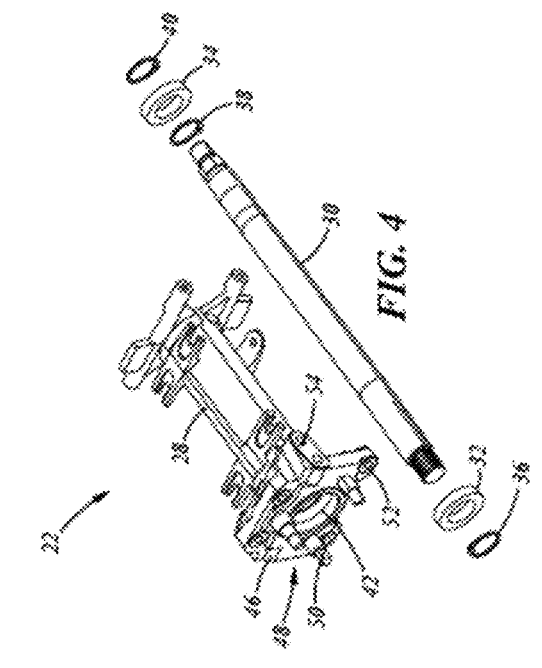
FIG. 4 is an exploded, perspective view of the steering column of FIG. 3.
Figure 3:
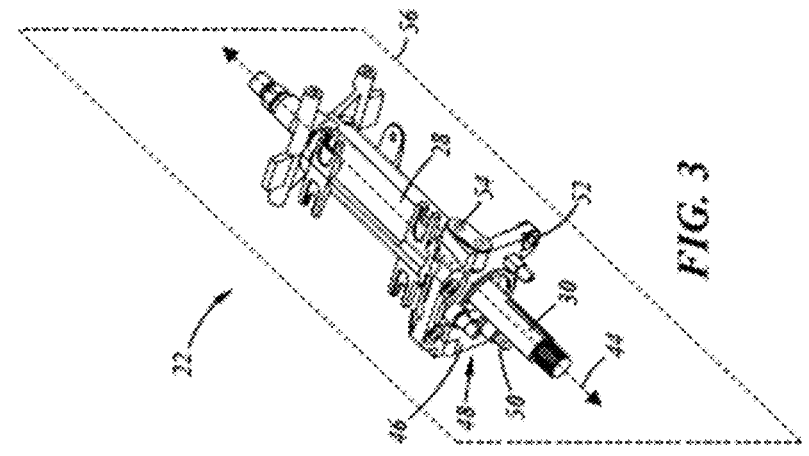
FIG. 3 is a perspective view of the steering column of the steering assembly of FIGS. 1-2.

Referring to FIGS. 3-4, steering column 22 provides a means for the driver to input steering forces on a steering wheel shaft 30 of column 22 and to transfer those forces to the vehicle steering gear. Column 22 may include a housing 28, a steering shaft 30 bearings 32, 34 and retainer clips 36, 38, 40.

Housing 28 positions and orients shaft 30 and other components of column 22 and protects those components from foreign objects and elements. Housing 28 defines a central bore 42 that is configured to receive shaft 30, bearings 32, 34, and retainer clips 36, 38, 40 and that may be disposed about, and centered about, a rotational axis 44 of shaft 30. Housing 28 may include a steering column mounting bracket 46 proximate one end of housing 28 that provides means, such as interface 48, for interfacing with apparatus 26. Interface 48 may include a plurality of alignment pins 50 and pluralities of fastener bores 52, 54. Pins 50 project from bracket 46 in a direction parallel to axis 44 and to a plane 56 that contains axis 44 and extends through the front and rear of the vehicle. Fastener bores 52 also extend in a direction parallel to axis 44 and to plane 56. Fastener bores 54 extend in a direction perpendicular to plane 56. In the illustrated embodiment, two fastener bores 54 are disposed on either side of bracket 46 with an upper fastener bore 54 (closest to the steering wheel) disposed partially forward of the lower fastener bore 54. Bracket 46 may be a common mounting bracket enabling connection of steering columns having a variety of different configurations to apparatus.

Referring again to FIGS. 3-4, steering shaft 30 transfers rotational forces input by the driver through a steering wheel (not shown) disposed at one end of shaft 30. Shaft 30 is configured for rotation about rotational axis 44. Shaft 30 may be configured at one end for connection to the steering wheel. The other end of shaft 30 may be configured for connection directly to a steering gear or, when objects in the engine compartment prevent a direct connection, to a universal joint that couples shaft 30 to another shaft connected to the steering gear.

Bearings 32, 34 are provided to allow rotation of shaft 30 relative to housing 28. Bearings 32, 34 are conventional in the art and may be disposed within bore 42 proximate either end of shaft 30.

Retainer clips 36, 38, 40 are provided to maintain the position of bearings 32, 34, relative to shaft 30. Clips 36, 38, 40 are conventional in the art and may be received within corresponding grooves in shaft 30.

Figure 6:
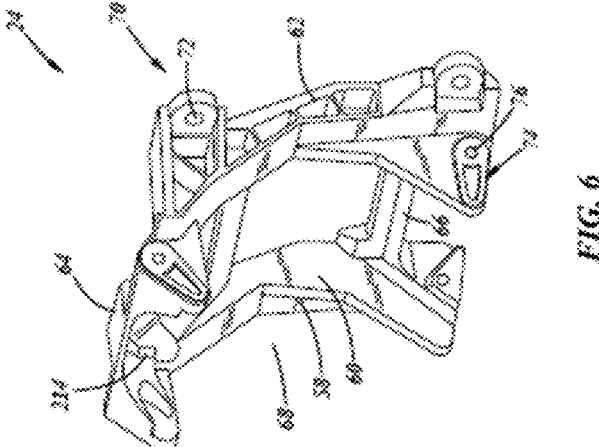
FIGS. 5-6 are perspective views of the vehicle body mounting bracket of the steering assembly of FIGS. 1-2.
Figure 5:
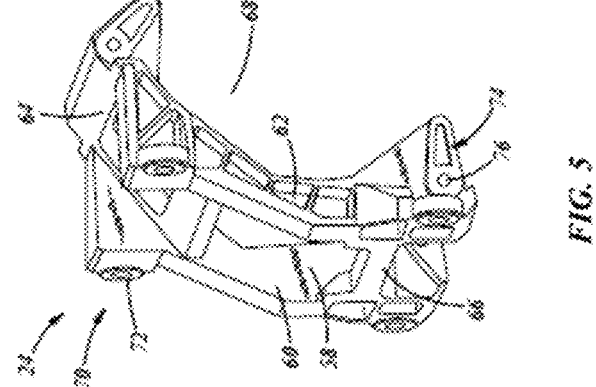

Referring now to FIGS. 5-6, vehicle body mounting bracket 24 is provided to couple apparatus 26 to the vehicle body. In the illustrated embodiment, bracket 24 is a unitary or one-piece body 58 including side portions 60, 62, and upper and lower portions 64, 66 extending between side portions 60, 62. Body 58 defines a substantially concave opening 68 configured to receive apparatus 26. Body 58 defines means, such as interface 70, for interfacing with the vehicle body. In the illustrated embodiment, interface 70 includes four fastener bores 72 with a pair of lower fastener bores 72 disposed forward of a pair of upper fastener bores 72. It should be understood, however, that the number, location and relative positioning of fastener bores 72 may vary. Body 58 also defines means, such as interface 74, for interfacing with apparatus 26. In the illustrated embodiment, interface 74 includes four fastener bores 76 with a pair of lower fastener bores 76 disposed forward of a pair of upper fastener bores 76. The lower fastener bores 76 and the upper fastener bores 76 may be aligned on parallel axes that extend in a direction perpendicular to plane 56 upon assembly of steering assembly 20. It should be understood that the configuration of bracket 24 may vary.

Figure 7:
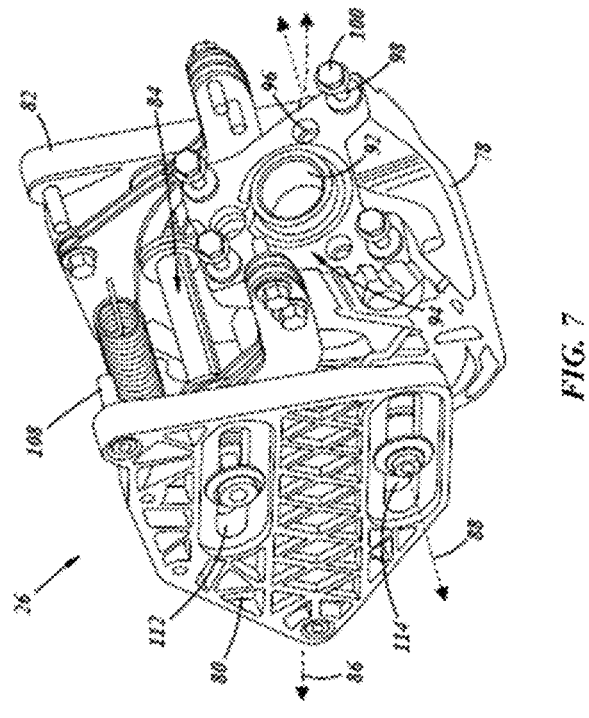
FIG. 7 is a perspective view of one embodiment of an apparatus of the steering assembly of FIGS. 1-2 for mounting a steering column in a vehicle.

Referring now to FIG. 7-12, apparatus 26 is provided to mount steering column 22 in the vehicle and to allow the driver to adjust the position of column 22 relative to the driver and other portions of the vehicle. Referring to FIG. 7, apparatus 26 may include a steering column body 78, side brackets 80, 82, and means, such as translation and pivot mechanism 84, to enable translational or linear movement of steering column body 78 and steering column 22 relative to side brackets 80, 82 and vehicle mounting bracket 24 along an axis 86 contained within or parallel to plane 56 (i.e., towards and away from the driver) and rotational movement of steering column body 78 and steering column 22 relative to side brackets 80, 82 and vehicle mounting bracket 24 about an axis 88 extending perpendicular to plane 56. Referring to FIG. 1, apparatus 26 may also include means, such as position locking assembly 90, for controlling (i.e., preventing or allowing) movement of steering column body 78 and steering column 22 relative to side brackets 80, 82 and vehicle mounting bracket 24.

Figure 10:
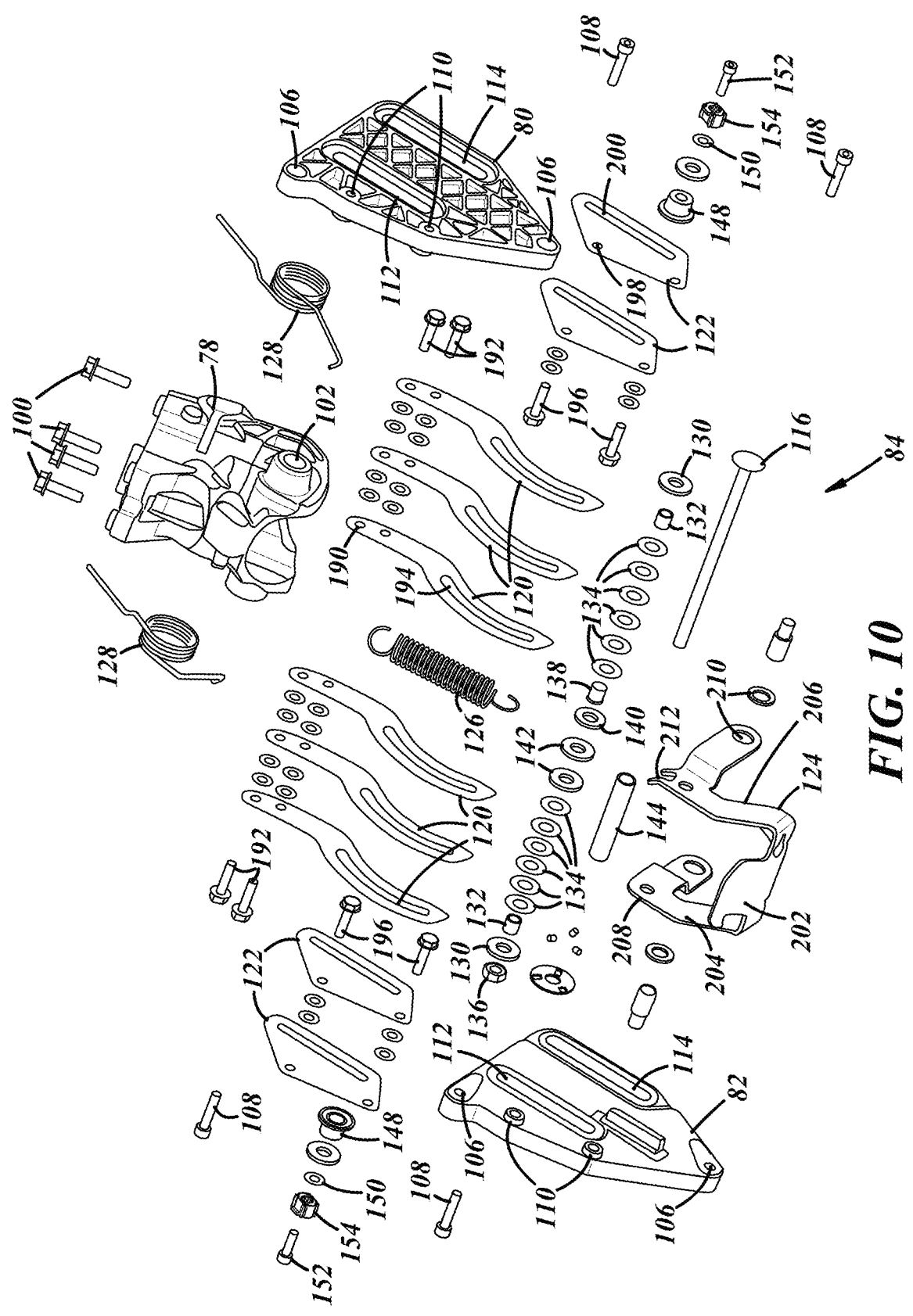
FIG. 10 is an exploded, perspective view of the apparatus of FIGS. 7-9.

Referring again to FIG. 7, steering column body 78 is configured to receive and support steering column 22. Steering column body 78 also provides a means for mounting, and structural support for, other components of apparatus 26. Steering column body 78 defines a central bore 92 configured to receive one end of steering shaft 30 upon assembly of steering assembly 20. Bore 92 may therefore be aligned with bore 42 in housing 28 and may be disposed about, and centered about axis 44 upon assembly. Steering column body 78 defines means, such as interface 94, for interfacing with steering column mounting bracket 46 and maintaining bracket 46 in a fixed position relative to steering column body 78. Interface 94 may include a plurality of alignment pin bores 96 and a plurality of fastener bores 98. Alignment pin bores 96 are configured to receive alignment pins 50 on bracket 46 and extend in a direction parallel to axis 44 and plane 56. Fastener bores 98 are configured to received fasteners 100 used to couple bracket 46 to steering column body 78 in a fixed position. Fastener bores 98 also extend in a direction parallel to axis 44 and to plane 56. During assembly of steering assembly 20, one or both of steering column 22 and apparatus 26 are moved to align alignment pins 50 on bracket 46 with alignment pin bores 96 on steering column body 78 and fastener bores 52 on bracket 46 with fastener bores 98 on steering column body 78. Subsequently, one or both of steering column 22 and apparatus 26 are moved in a direction parallel to axis 44 and alignment pins 50 on steering column mounting bracket 46 are inserted into alignment pin bores 96 on steering column body 78. Thereafter, fasteners 100 such as screws or bolts are inserted through fastener bores 52 in bracket 46 and into fastener bores 98 in steering column body 78 in a direction parallel to axis 44 and plane 58. Referring to FIG. 10, steering column body 78 further defines pivot pin receiving bores 102 on either side of steering column body 78 extending in a direction perpendicular to plane 58 for a purpose described below.

Figure 12:
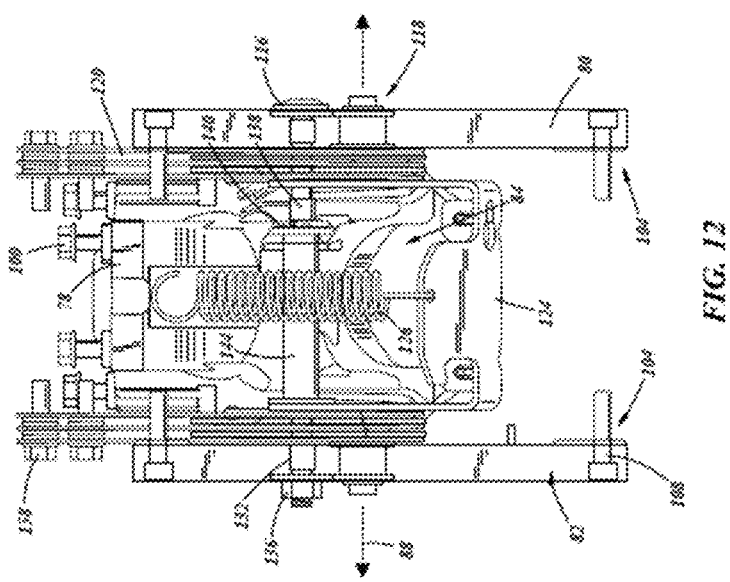
FIG. 12 is a partially transparent front view of the apparatus of FIGS. 7-10.
Figure 11:
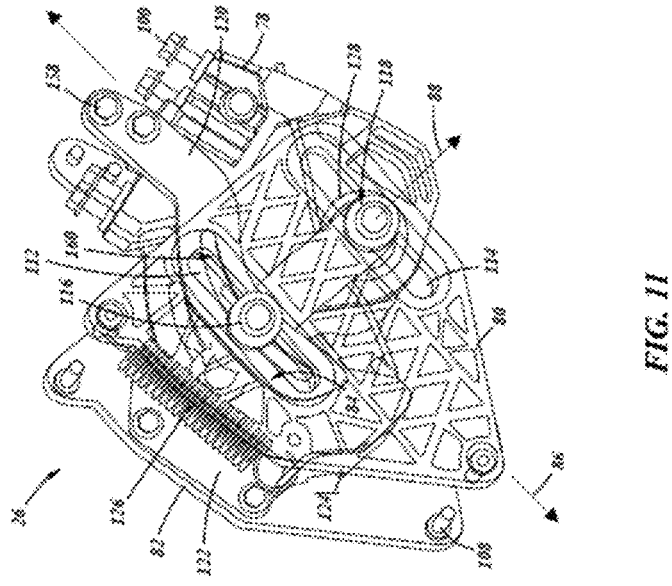
FIG. 11 is a partially transparent perspective view of the apparatus of FIGS. 7-10.

Referring again to FIG. 1, side brackets 80, 82 couple apparatus 26 to vehicle body mounting bracket 24. Referring to FIG. 12, brackets 80, 82 include means, such as interface 104, for interfacing with vehicle body mounting bracket 24. Referring to FIG. 10, interface 104 includes a plurality of fastener bores 106 that are configured for alignment with corresponding bores 76 of interface 74 of vehicle body mounting bracket 24. In the illustrated embodiment, consistent with the configuration for vehicle mounting bracket 24, side brackets 80, 82 together include four fastener bores 106 with a pair of aligned lower fastener bore 106 disposed forward of a pair of aligned upper fastener bore 106. The lower fastener bores 106 and the upper fastener bores 106 may be aligned on parallel axes that extend in a direction perpendicular to plane 56 upon assembly of steering assembly 20. Bores 106 are configured to receive fasteners 108 such as screws or bolts extending through bores 106 in side brackets 80, 82 and into bores 76 in vehicle body mounting bracket 24. Both bores 106 in side brackets 80, 82 and, upon assembly, fasteners 108 extend in a direction perpendicular to plane 56. Fasteners 108 include a pair of upper fasteners 108 that extend through the pair of upper fastener bores 106 in side brackets 80, 82 and the upper fastener bores 76 in vehicle body mounting bracket 24 and a pair of lower fasteners 108 that extend through the pair of lower fastener bores 108 in side brackets 80, 82 and the lower fastener bores 76 in vehicle body mounting bracket 24. The upper fasteners 108 are inserted through the upper bores 106, 76 in opposite directions and are disposed about a common axis perpendicular to plane 56. Similarly, lower fasteners 108 are inserted through the lower bores 106,76, in opposite directions and are disposed about a common axis perpendicular to plane 56 and parallel to the axis of the upper fasteners 108. Referring again to FIG. 10, in addition to fastener bores 106, each side bracket 80, 82 further includes a pair of fastener bores 110 for a purpose described below.

Referring again to FIG. 7, side brackets 80, 82 are further coupled to either side of steering column body 78 in a manner permitting translational movement of steering column body 78 and steering column 22 relative to side brackets 80, 82 and vehicle mounting bracket 24 along axis 86 in a direction towards and away from the driver and rotational movement of steering column body 78 and steering column 22 relative to side brackets 80, 82 and vehicle mounting bracket 24 about axis 88. Each side bracket 80, 82 includes parallel upper and lower slots 112, 114. As discussed in greater detail below, slots 112, 114 are configured to receive elements of translation and pivot mechanism 84. Slots 112, 114 are elongated in a direction moving between steering column 22 and vehicle body mounting bracket 24. The upper slots 112 in brackets 80, 82 are aligned with one another upon assembly of apparatus 26. Similarly, the lower slots 114 in brackets 80, 82 are aligned with one another upon assembly of apparatus 26.

Figure 9:
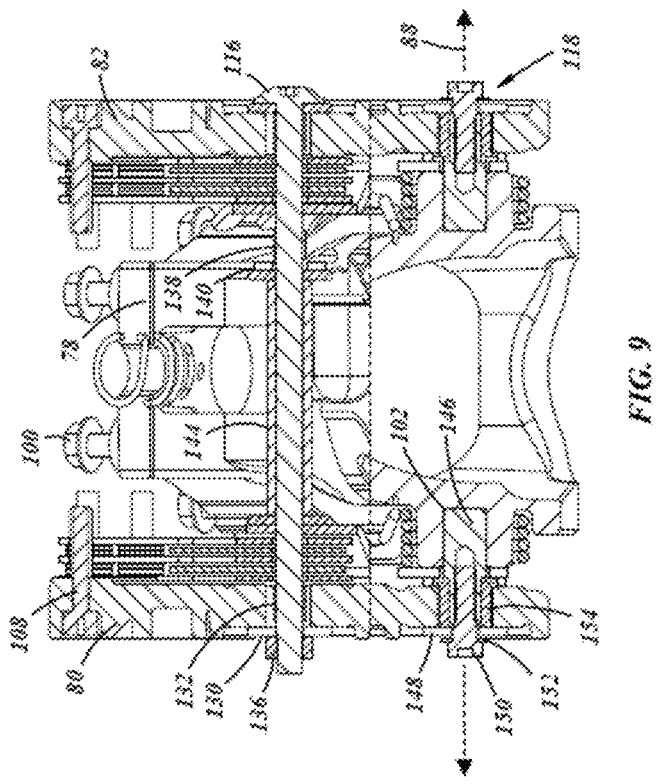
FIG. 9 is a cross-sectional view of the apparatus of FIGS. 7-8 taken along the line A-A in FIG. 8.
Figure 8:
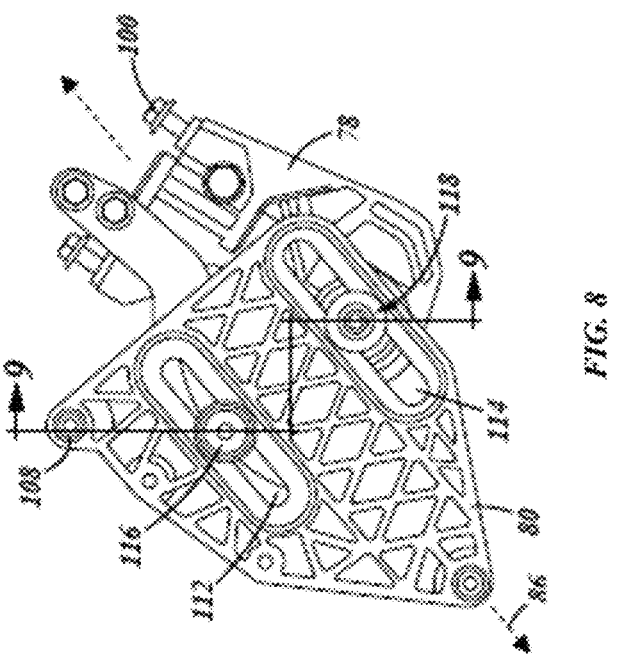
FIG. 8 is a side view of the apparatus of FIG. 7.

Translation and pivot mechanism 84 provides a means for enabling translational or linear movement of steering column body 78 and steering column 22 relative to side brackets 80, 82 and vehicle mounting bracket 24 along axis 86 (i.e., towards and away from the driver) and rotational movement of steering column body 78 and steering column 22 relative to side brackets 80, 82 and vehicle mounting bracket 24 about axis 88 (i.e., tilting). Referring to FIG. 9, mechanism 84 may include a positioning fastener 116 and a pivot assembly 118. Referring to FIG. 10, mechanism 84 further includes tilt plates 120, reinforcement plates 122, a spring connection plate 124, an extension spring 126, and torsion springs 128.

Positioning fastener 116 couples steering column body 78 to side brackets 80, 82, through tilt plates 120. Fastener 116 may comprise a domed head Allen screw. Fastener 116 extends through the upper slot 112 in side bracket 80, a first set of interleaved tilt plates 120 and reinforcement plates 122 on one side of steering column body 78, a second set of interleaved tilt plates 120 and reinforcement plates 122 on the opposite side of steering column body 78 and the upper slot 112 in side bracket 82. Referring to FIG. 10, fastener 116 may extend through washers 130 disposed on an outboard side of each side bracket 80, 82, sleeves 132 that are disposed within upper slots 112 in side brackets 80, 82 to facilitate movement of fastener 116 along slots 112, washers 134 adjacent each side of a tilt plate 120 or reinforcement plate 122 in each set of interleaved tilt plates 120 and reinforcement plates 122, and a nut 136 on an outboard side of side bracket 82. Between the two sets of tilt plates 120 and reinforcement plates 122, fastener 114 may further extend through a sleeve 138, a thrust bearing 140, washers 142 and a reinforcement tube 144. Sleeve 138 and/or tube 144 are configured to receive elements of position locking assembly 90 as discussed in more detail below.

Referring to FIG. 9, pivot assembly 118 couples steering column body 78 to side brackets 80, 82 in a manner allowing translational movement of steering column body 78 and steering column 22 relative to side brackets 80, 82 and vehicle mounting bracket 24 along axis 86 and rotational movement of steering column body 78 and steering column 22 relative to side brackets 80, 82 and vehicle mounting bracket 24 about axis 88. Assembly 118 may include a pair of pivot pins 146, washers 148, fasteners 150, and bushings 152. Assembly 118 also includes a pair of sliding contact bearings 154 in accordance with the teachings set forth herein.

Pivot pins 146 are configured to be received within pivot pin receiving bores 102 on either side of body 78 and are maintained within bores 102 through an interference fit. Pivot pins 146 may be disposed about, and centered about, axis 88 and project outward from bores 102 into lower slots 112 in side brackets 80, 82. Washers 148 are disposed on an outboard side of each side bracket 80, 82 and are held in place by fasteners 150 that extending through a corresponding flanged bushing 152 and corresponding washer 148 into a closed bore in a corresponding pivot pin 146.

Sliding contact bearings 154 enable (i) translational movement of pivot pins 146 along slots 112 in side brackets 80, 82 during translational movement of body 78 and steering column 22 relative to side brackets 80, 82 along axis 86 and (ii) rotational movement of body 78 and steering column 22 relative to side brackets 80, 82 about axis 88. In accordance with the teachings disclosed herein, sliding contact bearings 154 are configured to reduce radial lash following movement of the bearings 154 within slots 112. Referring now to FIGS. 13-17, sliding contact bearings 154 include a bearing body 156 and four legs 158, 160, 162, 164.

Figure 16:
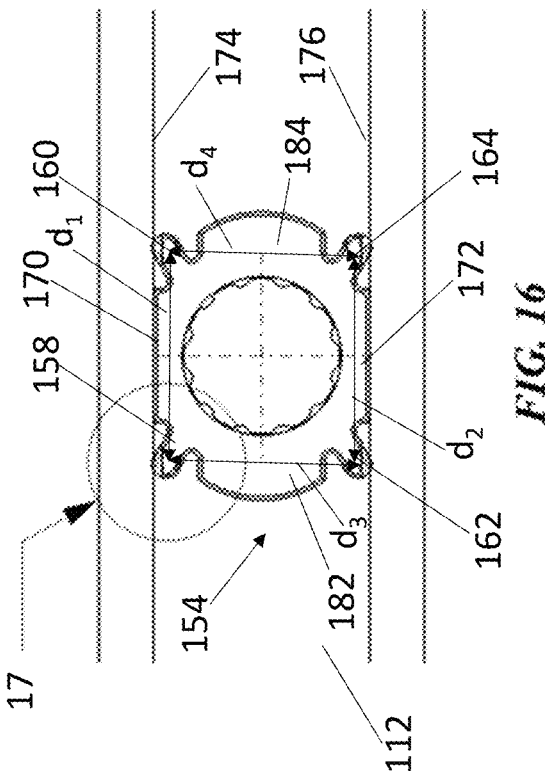
FIG. 16 is a plan view of the sliding contact bearing of FIGS. 13-14 positioned within a slot in the apparatus of FIGS. 7-12.

Referring to FIG. 13, bearing body 156 is configured for insertion within, and movement along, slot 112 as well as rotation about axis 88. Referring to FIG. 14, bearing body 156 is annular in shape and defines a bore 166 that may be disposed about, and centered about, axis 88. Bore 166 is sized to receive a pivot pin 146 therein. A radially inner surface of bearing body 156 defines a plurality of ribs 168 that may extend along the entire axial length of bearing body 156 and bore 166. Ribs 168 may be semicircular in cross-section and circumferentially spaced and are configured to engage a radially outer surface of pivot pin 146 in an interference fit. A radially outer surface of bearing body 156 defines diametrically opposite flats 170, 172. Referring to FIG. 16, flats 170, 172 are configured to engage opposing surfaces 174, 176, respectively, formed in slot 112. Flat 170 is disposed circumferentially between legs 158, 160 while flat 172 is disposed circumferentially between legs 162, 164. Referring again to FIGS. 13-14, at one end of each flat 170, 172, body 156 may define radially outwardly extending flanges 178, 180 configured for engagement with one side of a corresponding side bracket 80, 82 to limit movement of bearing 154 along axis 88 and facilitate proper positioning of bearing 154. Circumferential portions 182, 184 of the radially outer surface of bearing body 156 may be arcuate, or curved, in shape between legs 158, 162 and between legs 160, 164, respectively-having a shape complementary to the shape of a corresponding end of slot 112.

Legs 158, 160, 162, 164 take up radial lash resulting from movement of sliding contact bearing 154 within slot 112 during adjustment of the position of steering column body 78 and steering column 22 while also limiting friction between bearing 154 and the surfaces of slot 112 during movement of bearing 154 within slot 112. Legs 158, 160, 162, 164 project radially from bearing body 156 and may form a unitary (one-piece) structure with bearing body 156. Legs 158, 160 are disposed on opposite circumferential sides of flat 170 with leg 158 disposed circumferentially between portion 182 of bearing body 156 and flat 170 and leg 160 disposed circumferentially between portion 184 of bearing body 156 and flat 170. Legs 162, 164 are disposed on opposite circumferential sides of flat 172 with leg 162 disposed circumferentially between portion 182 of bearing body 156 and flat 172 and leg 164 disposed circumferentially between portion 184 of bearing body 156 and flat 172. Referring to FIG. 13, legs 158, 160, 162, 164 may extend along an entirety of an axial length of bearing body 156 in some embodiments. Referring to FIG. 15, an axial end of each leg 158, 160, 162, 164 distant from flanges 178, 180 may include a chamfer 186 facilitating insertion of sliding contact bearing 154 into slot 112. Referring again to FIG. 14, along the remainder of the axial length of each leg 158, 160, 162, 164, a radially outermost portion of each leg 158, 160, 162, 164 may have a curved shape in cross-section.

Figure 17:
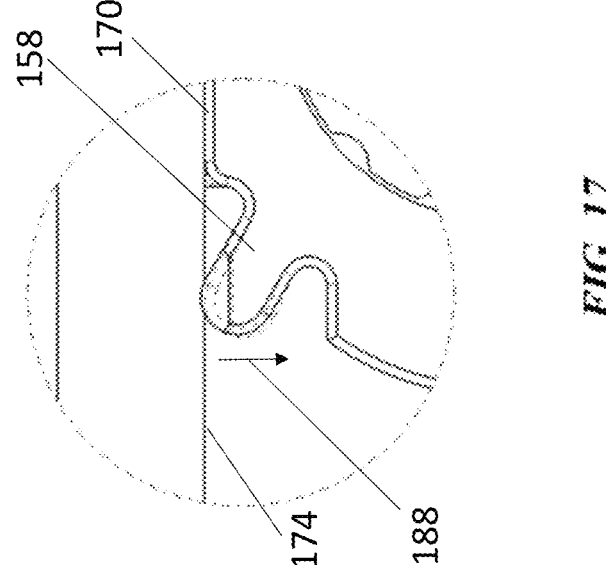
FIG. 17 is an enlarged view of a portion of FIG. 16 illustrating unstressed and stressed positions for a portion of the sliding contact bearing of FIGS. 13-14.

Legs 158, 160, 162, 154 are elastically deformable. In particular, legs 158, 160, 162, 164 and, in some embodiments, sliding contact bearing 154 as a whole, may be made from a polymeric material that is elastically deformable, such as a nylon material. Referring to FIG. 16, upon insertion of bearing 154 into slot 112, legs 158, 160 are configured for engagement with surface 174 of slot 112 while legs 162, 164 are configured for engagement with surface 176 of slot 112. Referring to FIG. 17, insertion of bearing body 156 into slot 112 causes movement of each of legs 158, 160 in a direction indicated by arrow 188 from an unstressed position to a stressed position. Similarly, insertion of bearing body 156 into slot 112 causes movement of each of legs 162, 164 in the opposite direction to arrow 188 from an unstressed position (indicted in solid lines) to a stressed position (indicated in dashed lines). Referring again to FIG. 16, as legs 158, 160, 162, 164 move from unstressed positions to stressed positions, the distances $d_1$, $d_2$ between the geometric centers of legs 158, 160 and 162, 164, respectively, increases. Conversely, the distances $d_3$, $d_4$ between the geometric centers of legs 158, 162 and 160, 164, respectively, decreases. The deformation of legs 158, 160, 162, 164 reduces or eliminates radial lash when an operator adjusts the position of the steering wheel using translation and pivot mechanism 84.

Referring again to FIG. 10, tilt plates 120 facilitate rotational movement of body 78 and steering column 22 about axis 88 relative to side brackets 80, 82 and vehicle mounting bracket 24. In the illustrated embodiment, three tilt plates 120 are disposed on either side of body 78 and interleaved with reinforcing plates 122. It should be understood, however, that the number of tilt plates 120 may vary. Each tilt plate 120 includes means, such as fastener bores 190 for interfacing with the steering column mounting bracket 46 proximate one end. Bores 190 are configured to receive fasteners 192 such as screws or bolts that extend through bores 190 in tilt plates 120 and, referring to FIG. 3, into bores 54 in bracket 46 in a direction perpendicular to plane 56. Referring again to FIG. 10, each tilt plate 120 further includes an arcuate slot 194 formed proximate another end that is configured to receive positioning fastener 116. During rotation of body 78 and steering column 22 about axis 88, tilt plates 120 will move with body 78 and steering column 22 and positioning fastener 116 will be repositioned within slots 194 in tilt plates 120.

Reinforcement plates 122 provide additional structural support to apparatus 26 and, with tilt plates 120, provide a frictional force resisting movement of body 78 and steering column 22 when position locking assembly 90 is in a locked position. Plates 122 may be coupled to side plates 80, 82 using fasteners 196 that extend through aligned bores 198, 110 in plates 122 and side brackets 80, 82, respectively. Plates 122 define a longitudinal slot 200 configured for alignment with upper slot 112 in side brackets 80, 82 and configured to receive positioning fastener 116. Reinforcement plates 122 are interleaved with tilt plates 120, but unlike tilt plates 120 remain in a fixed in position relative to side brackets 80, 82 during movement of body 78 and steering column 22 relative to side brackets 80, 82 and vehicle mounting bracket 24.

Spring connection plate 124 provides a means for mounting one end of each of springs 126, 128 used in preventing abrupt movement of steering column 22 when position locking assembly 90 is in an unlocked position. Connection plate 124 is disposed between side brackets 80, 82 and includes a body 202 and arms 204, 206 projecting from either side of body 202. Body 202 is disposed centrally between side brackets 80, 82 and is configured for connection to one end of each of springs 126, 128. Each arm 204, 206 defines a pair of bores 208, 210 configured to receive positioning fastener 116 and a corresponding pivot pin 146 of pivot assembly 118. Arm 206 further defines a means, such as interface 212, for interfacing with position locking assembly 90. In the illustrated embodiment, interface 212 includes a pair of spaced fingers that extend upward from arm 206 and then bend in an inboard direction.

Extension spring 126 is configured to prevent abrupt movement of steering column 22 along axis 86 when position locking assembly 90 is in an unlocked position and to return body 78 and steering column 22 to a default position along axis 86. Referring to FIG. 6, one end of spring 126 may be coupled to a notch 214 formed in vehicle mounting bracket 24. Referring to FIG. 12, the other end of spring 126 may be coupled to body 202 of spring connection plate 124.

Torsion springs 128 are configured to prevent abrupt movement of steering column 22 about axis 88 and to return body 78 and steering column 22 to a default position about axis 88. Referring to FIG. 10, one end of each spring 128 may be coupled to body 78. The other end of each spring 128 may be coupled to body 202 of spring connection plate 124.

Figures 18, 19:
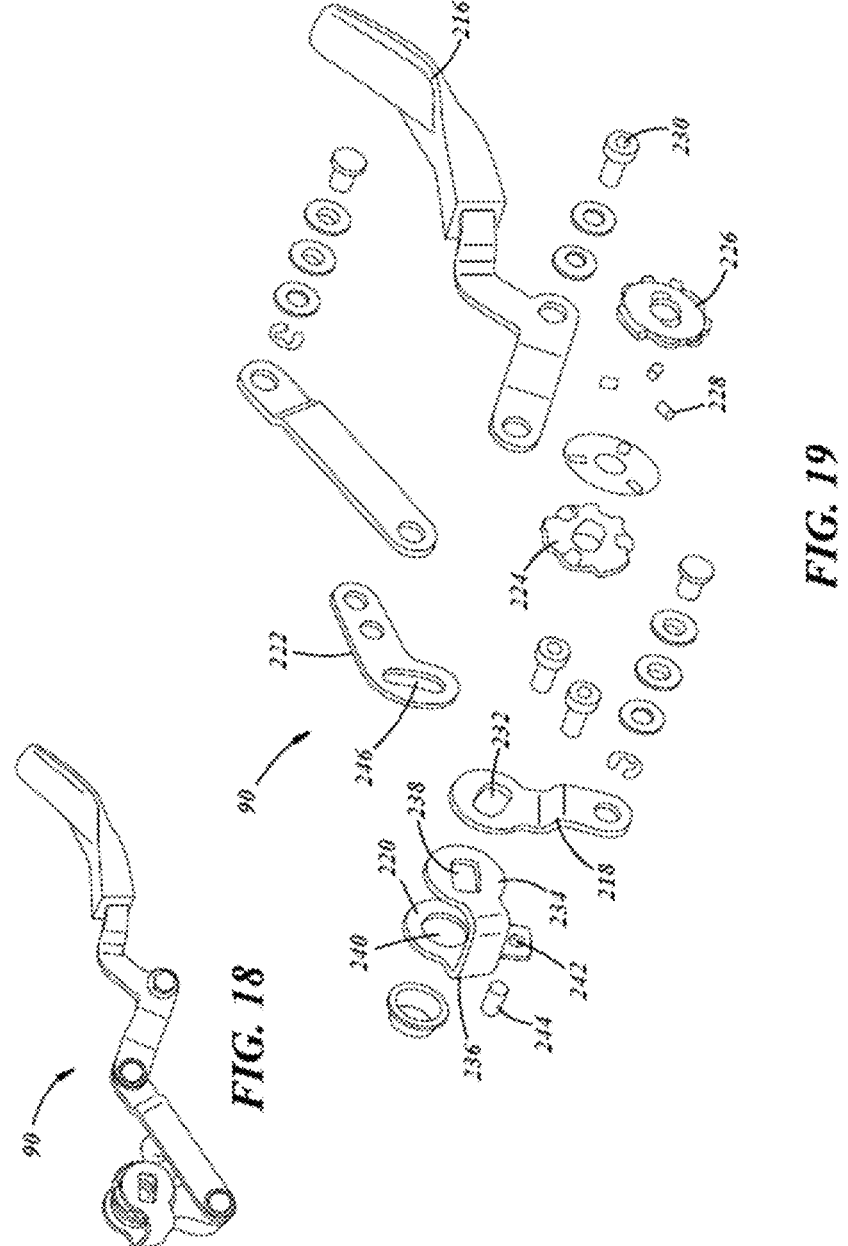
FIGS. 18 and 19 are perspective and exploded views of one embodiment of a position locking assembly for use in the steering assembly of FIGS. 1-2.

Referring now to FIGS. 18-19, position locking assembly 90 provides means for controlling (i.e., preventing or allowing) movement of body 78 and steering column 22 relative to side brackets 80, 82 and vehicle mounting bracket 24. Assembly 90 may include a handle 216, a lever plate 218, a bearing ramp plate positioner 220, a lever positioner 222, bearing ramp plates 224, 226 and respective needle rollers 228. Handle 216 is provided to allow the driver to move body 78 and steering column 22 relative to side brackets 80, 82 and vehicle mounting bracket 24. Referring to FIG. 1, handle 216 may be coupled to body 78 using a conventional fastener 230 such as a screw or bolt. Lever plate 218 is configured to transfer a force exerted by the driver through handle 216 to bearing ramp plates 224, 226. One end of lever plate 218 may be coupled to handle 216 using a conventional fastener. The other end of lever plate 216 defines an opening 232 configured to receive positioning fastener 116 and sleeve 138 and to receive a portion of bearing ramp plate 224 such that bearing ramp plate 224 rotates with lever plate 218. Bearing ramp plate positioner 220 is configured for rotational movement about the axis of positioning fastener 116 and axial movement along the axis of positioning fastener 116 in response to movement of handle 216, lever plate 218, and bearing ramp plates 224, 226. Positioner 220 includes spaced arms 234, 236 defining aligned openings 238, 240 configured to receive positioning fastener 116 and sleeve 138. Opening 238 is further configured to receive a portion of bearing ramp plate 226 such that positioner 220 rotates with bearing ramp plate 226. Arm 234 of positioner 220 further defines a bore 242 configured to receive a rivet 244 that is also disposed within an arcuate slot 246 of fixed lever positioner 222 thereby restricting rotational movement of positioner 220 to a limited arc. Bearing ramp plates 224, 226 transfer rotational movement of lever plate 218 to bearing ramp plate positioner 220. Bearing ramp plates 224, 226 further include cam surfaces and needle rollers 228 that translate rotational movement of lever plate 218 into axial movement of positioner 220 to move positioner 220 between a lock position preventing movement of body 78 and steering column 22 relative to side brackets 80, 82 and vehicle mounting bracket 24 and a release position permitting movement of body 78 and steering column 22 relative to side brackets 80, 82 and vehicle mounting bracket 24. Movement of handle 216 causes rotation of lever plate 218 and bearing ramp plate 224 relative to bearing ramp plate 226 (needle rollers 228 may be disposed between bearing ramp plates 224, 226 and received within arcuate pockets in bearing ramp plates 224, 226 to permit a limited amount of relative rotation between bearing ramp plates 224, 226). As bearing ramp plate 224 rotates relative to bearing ramp plate 226, cam surfaces on plates 224, 226 cause axial movement of bearing ramp plate 226 relative to bearing ramp plate 224 and corresponding axial movement of positioner 220 to move positioner 220 between a lock position preventing movement of body 78 and steering column 22 relative to side brackets 80, 82 and vehicle mounting bracket 24 and a release position permitting movement of body 78 and steering column 22 relative to side brackets 80, 82 and vehicle mounting bracket 24.

A sliding contact bearing 154 in accordance with the present teachings is advantageous relative to conventional bearings. The bearing 154 takes up radial lash between the bearing 154 and the slot in which the bearing is positioned during movement of the bearing 154 within the slot. As a result, unexpected movement of the bearings 154 and structures supported by the bearings 154 following positional adjustments is reduced or eliminated. For example, in a steering assembly, once the position of the steering wheel has been adjusted by a vehicle operator and locked into the adjusted position, unintended movement of the steering wheel from forces applied to the steering wheel by the vehicle operator will be reduced or eliminated.

While the invention has been shown and described with reference to one or more particular embodiments thereof, it will be understood by those of skill in the art that various changes and modifications can be made without departing from the spirit and scope of the invention. For example, the over molding and clamping technology disclosed herein is not limited to wheel speed sensors, but may also be used for other sensors having similar mounting arrangements including transmission sensors and crankshaft sensors.

What is claimed is:

1. A sliding contact bearing, comprising:
a bearing body configured for insertion within, and movement along, a slot of a fixed structure, the bearing body defining
a bore disposed about an axis and configured to receive a shaft; and
a first flat on a radially outer surface of the bearing body and configured to engage a first surface formed in the slot; and,
a second flat on the radially outer surface of the bearing body, diametrically opposite the first flat and configured to engage a second surface formed in the slot opposing the first surface;
first and second legs projecting radially from the bearing body and disposed on opposite circumferential sides of the first flat, the first and second legs configured for engagement with the first surface formed in the slot and insertion of the bearing body into the slot causing movement of each of the first and second legs in a first direction from an unstressed position to a stressed position; and,
third and fourth legs projecting radially from the bearing body and disposed on opposite circumferential sides of the second flat, the third and fourth legs configured for engagement with the second surface formed in the slot and insertion of the bearing body into the slot causing movement of each of the third and fourth legs in a second direction, opposite the first direction, from an unstressed position to a stressed position.

2. The sliding contact bearing of claim 1 wherein the first, second, third and fourth legs are elastically deformable.

3. The sliding contact bearing of claim 1 wherein the bearing body and the first, second, third and fourth legs form a unitary structure.

4. The sliding contact bearing of claim 1 wherein a distance between a geometric center of the first leg and a geometric center of the second leg increases as the first and second legs move from the unstressed position to the stressed position.

5. The sliding contact bearing of claim 1 wherein a distance between a geometric center of the first leg and a geometric center of the third leg decreases as the first and third legs move from the unstressed position to the stressed position.

6. The sliding contact bearing of claim 1 wherein the radially outer surface of the bearing body is arcuate in shape between the first and third legs and between the second and fourth legs.

7. The sliding contact bearing of claim 1 wherein the first, second, third and fourth legs extend substantially along an entirety of an axial length of the bearing body.

8. The sliding contact bearing of claim 1 wherein at least one of the first, second and third and fourth legs includes a chamfer at one axial end.

9. The sliding contact bearing of claim 1 wherein a radially outermost portion of each of the first, second, third and fourth legs has a curved shape in cross-section.

10. An apparatus for mounting a steering column in a vehicle, comprising:
a steering column body configured to couple a steering column mounting bracket in a fixed position relative to the steering column body, the steering column mounting bracket configured to support the steering column;
a first side bracket configured for coupling to a vehicle body mounting bracket and coupled to a first side of the steering column body in a manner permitting translational movement of the steering column body relative to the first side bracket along a first axis and rotational movement of the steering column body relative to the first side bracket about a second axis, the first side bracket defining a first elongate slot;
a first pivot pin extending from the first side of the steering column body;
a first sliding contact bearing disposed within the first elongate slot of the first side bracket, the first sliding contact bearing having
a bearing body configured for insertion within, and movement along, the first elongate slot, the bearing body defining
a bore disposed about the second axis and configured to receive the first pivot pin; and
a first flat on a radially outer surface of the bearing body configured to engage a first surface formed in the first elongate slot; and,
a second flat on the radially outer surface of the bearing body, diametrically opposite the first flat and configured to engage a second surface formed in the first elongate slot opposing the first surface;
first and second legs projecting radially from the bearing body and disposed on opposite circumferential sides of the first flat, the first and second legs configured for engagement with the first surface formed in the first elongate slot and insertion of the bearing body into the first elongate slot causing movement of each of the first and second legs in a first direction from an unstressed position to a stressed position; and,
third and fourth legs projecting radially from the bearing body and disposed on opposite circumferential sides of the second flat, the third and fourth legs configured for engagement with the second surface formed in the first elongate slot and insertion of the bearing body into the first elongate slot causing movement of each of the third and fourth legs in a second direction, opposite the first direction, from an unstressed position to a stressed position.

11. The apparatus of claim 10, further comprising:
a second side bracket configured for coupling to the vehicle body mounting bracket and coupled to a second side of the steering column body, opposite the first side of the steering column body, in a manner permitting translational movement of the steering column body relative to the second side bracket along the first axis and rotational movement of the steering column body relative to the second side bracket about the second axis, the second side bracket defining a second elongate slot;

a second pivot pin extending from the second side of the steering column body;

a second sliding contact bearing disposed within the second elongate slot of the second side bracket, the second sliding contact bearing having a bearing body configured for insertion within, and movement along, the second elongate slot, the bearing body of the second sliding contact bearing defining a bore disposed about the second axis and configured to receive the second pivot pin; and a first flat on a radially outer surface of the bearing body of the second sliding contact bearing and configured to engage a first surface formed in the second elongate slot; and, a second flat on the radially outer surface of the bearing body of the second sliding contact bearing, diametrically opposite the first flat and configured to engage a second surface formed in the second elongate slot opposing the first surface;

first and second legs projecting radially from the bearing body of the second sliding contact bearing and disposed on opposite circumferential sides of the first flat of the bearing body of the second sliding contact bearing, the first and second legs of the second sliding contact bearing configured for engagement with the first surface formed in the second elongate slot and insertion of the bearing body of the second sliding contact bearing into the second elongate slot causing movement of each of the first and second legs of the second sliding contact bearing in the first direction from an unstressed position to a stressed position; and, third and fourth legs projecting radially from the bearing body of the second sliding contact bearing and disposed on opposite circumferential sides of the second flat of the bearing body of the second sliding contact bearing, the third and fourth legs of the second sliding contact bearing configured for engagement with the second surface formed in the second elongate slot and insertion of the bearing body of the second sliding contact bearing into the second elongate slot causing movement of each of the third and fourth legs of the second sliding contact bearing in the second direction, opposite the first direction, from an unstressed position to a stressed position.

12. The apparatus of claim 10 wherein the first, second, third and fourth legs of the first sliding contact bearing are elastically deformable.

13. The apparatus of claim 10 wherein the bearing body of the first sliding contact bearing and the first, second, third and fourth legs form a unitary structure.

14. The apparatus of claim 10 wherein a distance between a geometric center of the first leg and a geometric center of the second leg increases as the first and second legs move from the unstressed position to the stressed position.

15. The apparatus of claim 10 wherein a distance between a geometric center of the first leg and a geometric center of the third leg decreases as the first and third legs move from the unstressed position to the stressed position.

16. The apparatus of claim 10 wherein the radially outer surface of the bearing body is arcuate in shape between the first and third legs and between the second and fourth legs.

17. The apparatus of claim 10 wherein the first, second, third and fourth legs extend substantially along an entirety of an axial length of the bearing body.

18. The apparatus of claim 10 wherein at least one of the first, second and third and fourth legs includes a chamfer at one axial end.

19. The apparatus of claim 10 wherein a radially outermost portion of each of the first, second, third and fourth legs has a curved shape in cross-section.

\* \* \* \* \*